United States Patent
Cremering et al.

(10) Patent No.: US 11,326,506 B2
(45) Date of Patent: May 10, 2022

(54) VEHICLE FAN SHROUD WITH INTEGRATED SUPPORT STRUCTURE

(71) Applicant: Ford Global Technologies, LLC, Dearborn, MI (US)

(72) Inventors: Jeff James Cremering, Livonia, MI (US); Kenneth James Hayes, Northville Township, MI (US); Garrett Michael O'Donohue, Livonia, MI (US); Erin Gibb, Belle River (CA); Yi Zhang, Ann Arbor, MI (US); Michael Brett Sovine, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 16/502,639

(22) Filed: Jul. 3, 2019

(65) Prior Publication Data
US 2021/0003065 A1    Jan. 7, 2021

(51) Int. Cl.
*F01P 11/10* (2006.01)
*B60K 11/04* (2006.01)

(52) U.S. Cl.
CPC .............. *F01P 11/10* (2013.01); *B60K 11/04* (2013.01)

(58) Field of Classification Search
CPC ........ F01P 11/10; B60K 11/04; F04D 29/522; F04D 29/646; F04D 29/663; F04D 29/668
See application file for complete search history.

(56) References Cited

U.S. PATENT DOCUMENTS

| | | | |
|---|---|---|---|
| 5,219,016 A * | 6/1993 | Bolton | B60H 1/3227 165/140 |
| 5,878,594 A * | 3/1999 | Lazzaro | B60H 1/00535 62/474 |
| 5,947,189 A | 9/1999 | Takeuchi et al. | |
| 6,155,335 A | 12/2000 | Acre et al. | |
| 6,216,810 B1 * | 4/2001 | Nakai | B29C 37/0085 180/68.4 |
| 7,007,744 B2 * | 3/2006 | Kalbacher | F04D 29/582 123/41.49 |
| 7,640,966 B2 * | 1/2010 | Maeda | F28F 9/002 165/41 |
| 8,672,067 B2 | 3/2014 | Ajisaka | |
| 8,752,660 B2 | 6/2014 | Ajisaka | |
| 9,011,080 B2 * | 4/2015 | Rishton | F01D 25/162 415/142 |
| 9,261,011 B2 * | 2/2016 | Keerl | B60K 11/04 |

(Continued)

FOREIGN PATENT DOCUMENTS

| | | | | |
|---|---|---|---|---|
| DE | 4222264 A1 * | 1/1994 | | F28F 9/002 |
| EP | 1048505 A2 | 2/2000 | | |

(Continued)

*Primary Examiner* — Steve Clemmons
(74) *Attorney, Agent, or Firm* — Geoffrey Brumbaugh; McCoy Russell LLP

(57) ABSTRACT

Systems are provided for a vehicle fan shroud with integrated structural support. In one example, a fan shroud includes an opening adapted to house a fan impeller, and an upper extension and a lower foot adapted to couple the fan shroud to a vehicle in an angled position. The upper extension and lower foot provide structural support to the fan shroud to enable vehicle components such as a heat exchanger and condenser to be mounted to the fan shroud and maintained in position by the fan shroud.

20 Claims, 6 Drawing Sheets

(56) References Cited

U.S. PATENT DOCUMENTS

| | | | | |
|---|---|---|---|---|
| 9,982,586 | B2* | 5/2018 | Sovine | F02B 29/0431 |
| 2005/0109489 | A1* | 5/2005 | Kobayashi | F04D 29/601 |
| | | | | 165/121 |
| 2014/0251706 | A1* | 9/2014 | Shibutani | B60K 11/04 |
| | | | | 180/68.4 |
| 2016/0363039 | A1* | 12/2016 | Sovine | F02B 29/0431 |
| 2017/0145902 | A1* | 5/2017 | Sovine | F02B 29/0431 |
| 2017/0226920 | A1* | 8/2017 | Sovine | F01P 5/06 |
| 2019/0070952 | A1* | 3/2019 | Battaglini | B60K 11/04 |
| 2019/0193553 | A1* | 6/2019 | Uno | B60K 11/04 |

FOREIGN PATENT DOCUMENTS

| | | | | |
|---|---|---|---|---|
| JP | 2012138214 | A | 6/2014 | |
| KR | 900003944 | B1 * | 6/1990 | B60K 11/04 |
| KR | 20110037595 | A * | 4/2011 | |
| WO | WO-2011085750 | A1 * | 7/2011 | F01P 3/18 |
| WO | WO-2020054588 | A1 * | 3/2020 | B60K 11/04 |

* cited by examiner

VEHICLE FAN SHROUD WITH INTEGRATED SUPPORT STRUCTURE

FIELD

The present description relates generally to systems for vehicle component cooling, and in particular, a vehicle fan shroud.

BACKGROUND/SUMMARY

Vehicles often include cooling systems configured to cool one or more vehicle components. The cooling systems often include a fan configured to direct air across heat transfer features of a heat exchanger to provide convection cooling of the heat exchanger via ambient air. The heat exchanger is often positioned at a front end of a vehicle, along with the fan. However, in some vehicles, an amount of space at the front end conventionally occupied by the fan and heat exchanger may be occupied by other components of the vehicle.

Attempts to address the positioning of the fan and heat exchanger at the front end include modifying the coupling of the fan with the heat exchanger and the vehicle. One example approach is shown by Acre et al. in U.S. Pat. No. 6,155,335. Therein, a vehicle fan shroud and component cooling module are disclosed. The component cooling module includes a fan mounted within a fan ring between a radiator and a condenser. The component cooling module is secured at a front end of the vehicle and is cooled via ambient air flowing to a grill opening of the vehicle.

However, the inventors herein have recognized potential issues with such systems. As one example, such cooling modules may not fit in vehicles that do not include sufficient space at the front end. For example, a height of the cooling module may be larger than an amount of available vertical space at the front end. Additionally, positioning the fan between the radiator and condenser may result in insufficient cooling of the condenser due to the position of the condenser downstream of the radiator. Noise, vibration, and harshness may be increased as a result of air flowing in the space between the radiator and fan, as well as air flowing in the space between the fan and condenser.

In one example, the issues described above may be addressed by a fan shroud including an opening adapted to house a fan impeller, an upper extension including a first surface adapted to engage with an upper frame bracket of a vehicle, and a foot including a second surface adapted to engage with a lower frame bracket of the vehicle, where a normal of the second surface is parallel to a normal of the first surface and non-orthogonal to a normal of the opening. In this way, the fan shroud may be coupled to the upper frame bracket and lower frame bracket of the vehicle in an angled position that reduces an amount of vertical space occupied by the fan shroud and increases airflow to the fan impeller.

As one example, the fan shroud may include a plurality of mating features shaped to couple with counterpart mating features of a heat exchanger such that the fan shroud supports a weight of the heat exchanger at an inlet end of the fan impeller. Further, the fan shroud may include a plurality of asymmetrical reinforcement features at an outlet end, such as arms and ridges. The reinforcement features may alter an NVH characteristic of the fan impeller while operating in the angled position with the heat exchanger mounted to the fan shroud, and user comfort may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-6 are shown to scale, although other relative dimensions may be used, if desired.

DETAILED DESCRIPTION

The following description relates to systems for a vehicle fan shroud with an integrated support structure. A vehicle, such as the vehicle shown by FIG. 2, includes a coolant system, such as the coolant system shown schematically by FIG. 1, adapted to cool one or more components of the vehicle. The coolant system includes a fan having a fan shroud with an integrated support structure, similar to the fan shroud shown by FIGS. 3-6. Other components of the vehicle, such as a heat exchanger and a condenser of the coolant system, may mount to the fan shroud and may be supported in the mounted position by the fan shroud. The fan shroud may be coupled to a chassis of the vehicle in an angled position such that an axis of rotation of a fan impeller housed by the fan shroud is non-orthogonal and not parallel to a direction of gravity, as shown by FIG. 2. The fan shroud further includes a plurality of support arms and other reinforcement features arranged asymmetrically around a main opening of the fan shroud. The angled position of the fan shroud results in a reduced amount of space occupied by the fan shroud and the components mounted to the fan shroud (e.g., the heat exchanger and condenser) in a vertical direction of the vehicle (e.g., the direction of gravity). Further, the angled position of the fan shroud and the asymmetrical arrangement of the reinforcement features together may reduce a noise, vibration, and harshness (NVH) of vehicle operation and may increase user comfort.

Figure 1:
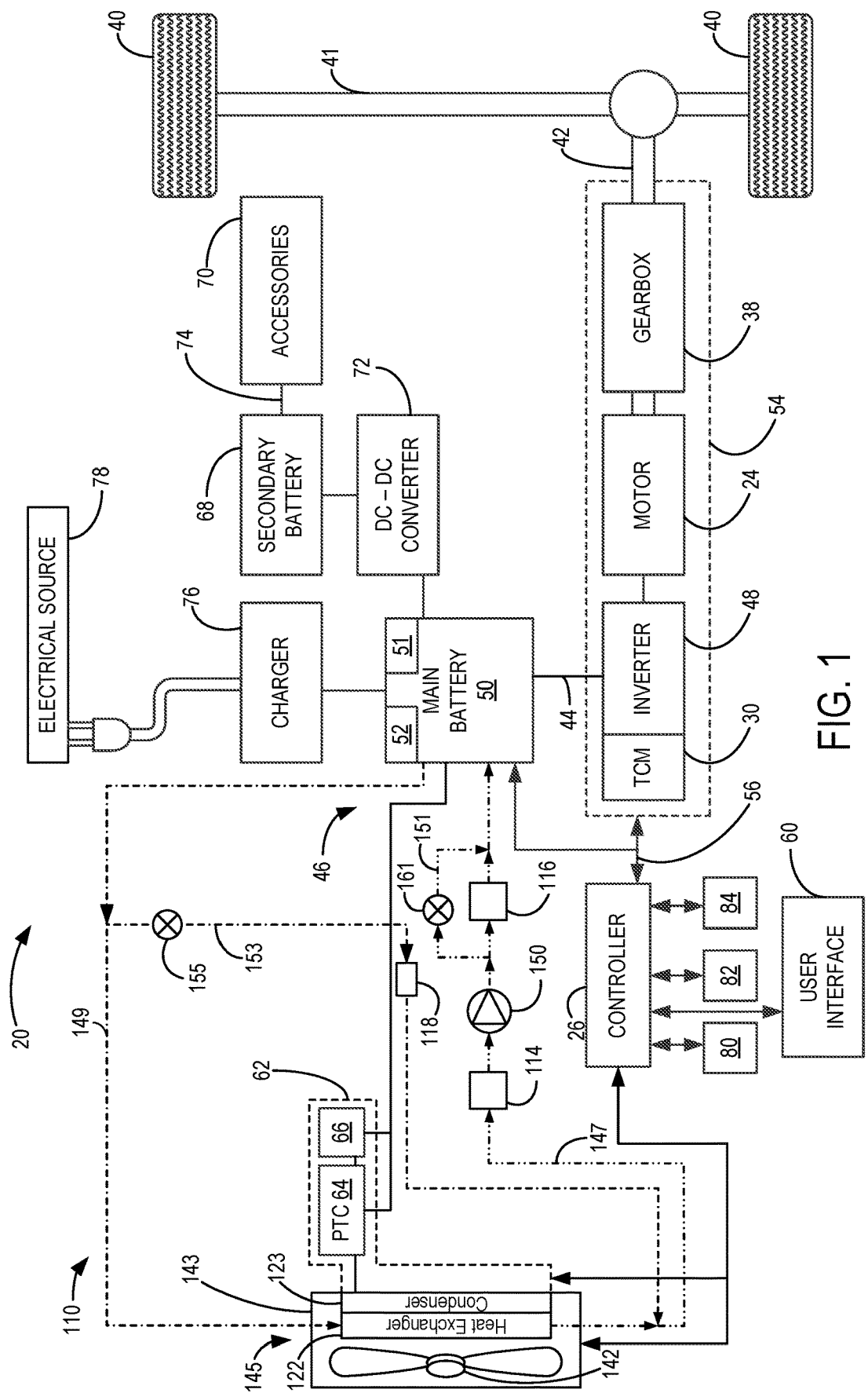
FIG. 1 schematically shows a block diagram of a vehicle including a coolant system, the coolant system including a fan shroud with an integrated support structure.
Figure 2:
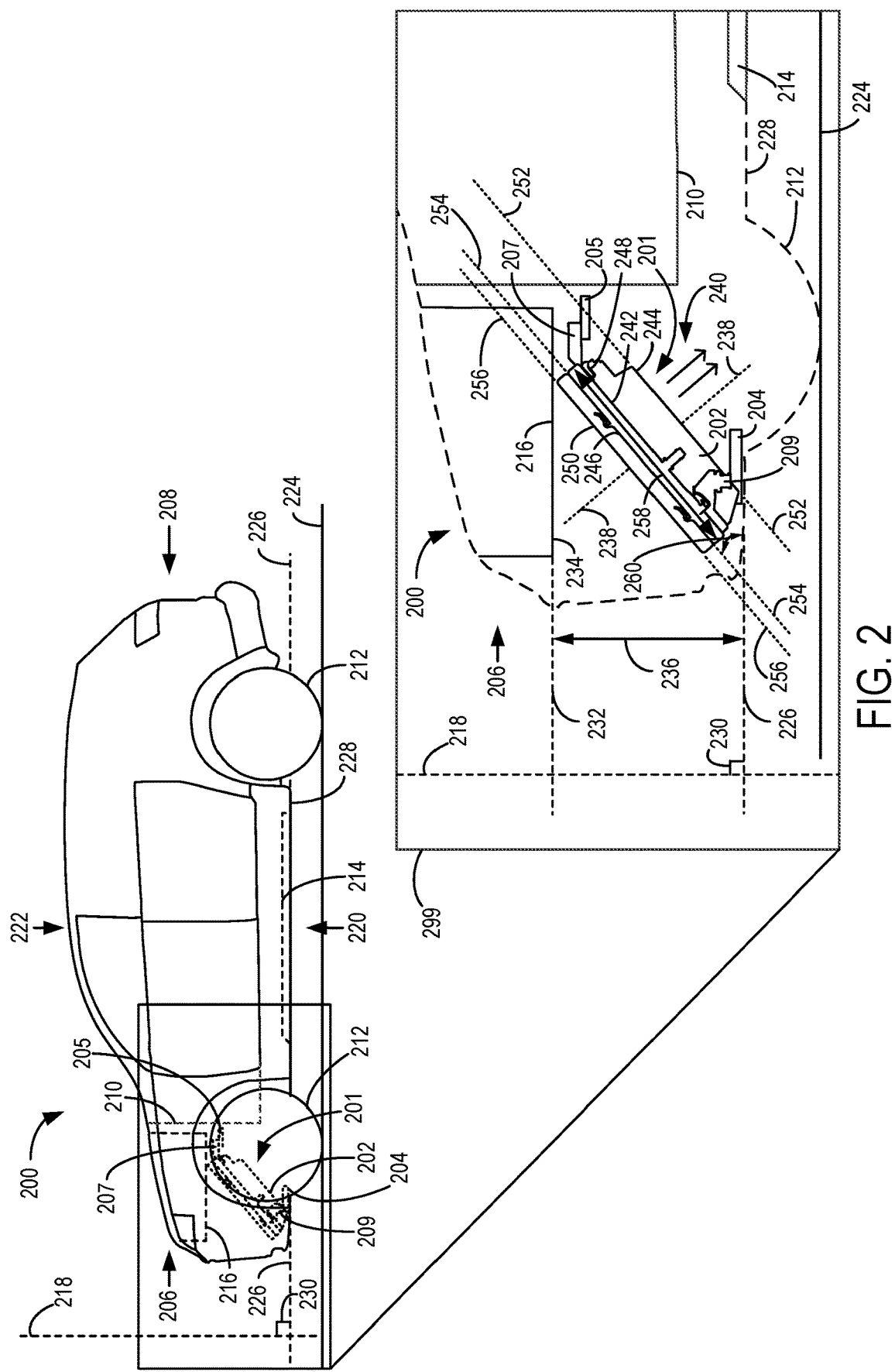
FIG. 2 shows a side view of a vehicle including a fan shroud with an integrated support structure.

With reference to FIG. 1, a vehicle 20 is shown schematically. In the example shown, vehicle 20 is an electric vehicle, such as a battery electric vehicle (BEV). For example, vehicle 20 may be powered (e.g., propelled) by electrical energy provided by main battery 50 without combustion of fuel and air (e.g., without combustion of gasoline, diesel fuel, and the like). As such, vehicle 20 may not include an internal combustion engine and may be driven solely by electrical energy stored within main battery 50. FIG. 1 represents only one example of BEV architecture, and is not intended to be limiting. For example, the present disclosure may be applied to other types of BEV architecture.

However, in other examples, vehicle 20 may be a different type of vehicle, such as a hybrid-electric vehicle (HEV) including both of main battery 50 and an internal combustion engine, with each of the main battery 50 and the engine configured to provide power to the vehicle for propulsion. In yet other examples, vehicle 20 may be configured to be driven by the internal combustion engine (e.g., via combustion of fuel and air) and may not include the main battery 50. However, in the examples described herein, vehicle 20 is a BEV, and because the vehicle 20 does not include an internal combustion engine, a space within the vehicle conventionally occupied by the internal combustion engine may be utilized for other components, such as a front storage trunk (referred to herein as a frunk).

The vehicle 20 includes an electric motor 24 configured to receive electrical power from main battery 50 and provide mechanical rotational output power to one or more axles of the vehicle 20 (e.g., rear axle 41). The electric motor 24 is connected to a gearbox 38 for adjusting the output torque and speed of the electric motor 24 by a predetermined gear ratio. The gearbox 38 is connected to a set of drive wheels 40 by an output shaft 42. Other embodiments of the vehicle 20 include multiple motors (not shown) for propelling the vehicle 20. The electric motor 24 may also function as a generator for converting mechanical power into electrical power. A high voltage bus 44 electrically connects the electric motor 24 to an energy storage system 46 through an inverter 48.

The energy storage system 46 includes main battery 50 and a battery energy control module (BECM) 52. The BECM is adapted to connect the vehicle 20 to an electrical source 78 (e.g., a 110 volt source or 220 volt source) and to send the electrical current received from the electrical source 78 to the main battery 50 or the transmission control system 30 (TCM).

The main battery 50 is a high voltage battery, or traction battery, that may output electrical power to operate the electric motor 24. The main battery 50 is a battery pack made up of one or more battery modules. Each battery module may contain one battery cell or a plurality of battery cells. The battery cells are cooled using at least an air coolant system including a fan 145 having a fan shroud 143 with an integrated support structure, as described further below. The BECM 52 acts as a controller for the main battery 50. The BECM 52 also includes an electronic monitoring system that manages temperature and state of charge of each of the battery cells. The main battery 50 has at least one temperature sensor 51, such as a thermistor or the like. The temperature sensor 51 is in communication with the BECM 52 to provide temperature data regarding the main battery 50.

The electric motor 24, the TCM 30, the gearbox 38, and the inverter 48 are collectively referred to herein as a transmission 54. The controller 26 communicates with the transmission 54, for coordinating the function of the transmission 54 with other vehicle systems. The controller 26, BECM 52, and TCM 30 are illustrated as separate controller modules. The control system for the vehicle 20 may include each of the controller 26, BECM 52, and TCM 30. In some examples, each of the controller 26, BECM 52, and TCM 30 may be integrated together as a single controller. In other examples, one or more of the controller 26, BECM 52, and TCM may include various modules. Some or all of the controllers may be connected by a controller area network (CAN) or other system. The control system may be configured to control operation of the various components of the transmission 54 and the main battery 50 under various different conditions, including in a way that thermally manages the temperature in the main battery 50 and the vehicle cabin or passenger compartment, and for charging and discharging operations of the main battery 50.

The TCM 30 is configured to control specific components within the transmission 54, such as the electric motor 24 and/or the inverter 48. The controller 26 monitors the temperature of the electric motor 24 and receives a throttle request (or desired motor torque request) from the driver. Using this information, the controller 26 provides a motor torque request to the TCM 30. The TCM 30 and the inverter 48 convert the direct current (DC) voltage supplied by the main battery 50 into signals (e.g., electrical signals) that are used to control the electric motor 24 in response to the motor torque request.

The controller 26 may provide information to a driver of the vehicle via a user interface 60. The user interface 60 may include features that permit a user (e.g., the driver) to adjust desired operating or charging parameters of the vehicle. In some examples, the user interface 60 may include a touch screen interface, a wireless connection to a remote station, such as a mobile device or computer, and/or other input interfaces. The controller 26 also receives input signals that are indicative of current operating conditions of the vehicle. For instance, the controller 26 may receive signals (e.g., electrical signals) from the BECM 52 to determine battery 50 operating conditions. The controller 26 may additionally and/or alternatively receive signals from the transmission 54 to determine electric motor 24 and inverter 48 operating conditions. The controller 26 provides an output to the user interface 60 (e.g., a motor status or charge level status) which is conveyed visually to the driver. The controller 26 arbitrates between the various user requests to thermally manage the vehicle 20 both on-charge and while operating.

The controller 26 receives signals from the various sensors of FIG. 1 and employs the various actuators of FIG. 1 to adjust engine operation based on the received signals and instructions stored on a memory of the controller. For example, adjusting an amount of coolant flow to a heater (e.g., high voltage electric heater 64, described below) may include adjusting an actuator of a valve upstream of the heater (e.g., heater bypass valve 161) to adjust the amount of opening of the valve (e.g., move the valve to a fully opened position, fully closed position, or a plurality of different positions between the fully opened position and fully closed position), with the amount of coolant flow being based on the amount of opening of the valve.

The vehicle 20 may include a climate control system 62 for heating and cooling various vehicle components. The climate control system 62 includes high voltage electric heater 64, a high voltage electric HVAC compressor 66, and a condenser 123. The heater 64 may heat coolant which circulates through the heater core, the compressor 66 is configured to compress refrigerant, and the condenser 123 is configured to condense refrigerant that cools the cabin and the main battery 50. Both the heater 64 and the compressor 66 may draw electrical energy directly from the main battery 50. The climate control system 62 may include a controller (not shown) for communicating with the controller 26 over the CAN bus 56. In some examples, the controller of the climate control system 62 may be integrated together with the controller 26. The on/off status (e.g., mode) of the climate control system 62 may be communicated to the controller 26. The on/off status may be based on a determined position of an operator actuated switch in some examples, In other examples, the on/off status may be based on whether the climate control system 62 is performing one or more functions (e.g., window defrost). The climate control system 62 may be connected to the user interface 60 to permit a user to select a temperature for the cabin and/or pre-program a temperature for a future operating cycle of the vehicle.

The vehicle 20 may include a secondary battery 68, such as a 12-volt battery. The secondary battery 68 may power various vehicle accessories such as headlights and the like, which are collectively referred to herein as accessories 70. A DC-to-DC converter 72 may be electrically interposed between the main battery 50 and the secondary battery 68. The DC-to-DC converter 72 adjusts, or "steps down," the voltage level such that the main battery 50 may charge the secondary battery 68. A low voltage bus 74 electrically connects the DC-to-DC converter 72 to the secondary battery 68 and the accessories 70.

The vehicle 20 includes an AC charger 76 for charging the main battery 50. An electrical connector connects the AC charger 76 to an external power supply (e.g., electrical source 78) for receiving AC power. The AC charger 76 includes power electronics which may convert, or "rectify," AC power received from the external power supply to DC power for charging the main battery 50. The AC charger 76 is configured to accommodate one or more conventional voltage sources from the external power supply (e.g., 110 volt source, 220 volt source, etc.). In one or more embodiments, the external power supply includes a device that harnesses renewable energy, such as a photovoltaic (PV) solar panel, or a wind turbine (not shown).

Also shown in FIG. 1 are simplified schematic representations of a driver controls system 80, a power steering system 82, and a navigation system 84. The driver controls system 80 includes braking, acceleration and gear selection (shifting) systems. The braking system may include a brake pedal, position sensors, pressure sensors, or a combination thereof. The component of the braking system may be mechanically coupled to the vehicle wheels (e.g., drive wheels 40) in order to apply friction braking to the vehicle wheels. The braking system may also be configured for regenerative braking, wherein braking energy may be captured and stored as electrical energy in the main battery 50. The acceleration system includes an accelerator pedal having one or more sensors, which, like the sensors in the braking system, provides information such as the throttle request to the controller 26. The gear selection system includes a shifter for manually selecting a gear setting of the gearbox 38. The gear selection system may include a shift position sensor for providing shifter selection information (e.g. park, drive, neutral) to the controller 26.

The navigation system 84 may include a navigation display, a global positioning system (GPS) unit, and/or a navigation controller and inputs (not shown) for receiving destination information or other data from a driver. The navigation system may be integrated with the user interface 60 in some embodiments. The navigation system 84 may also communicate distance and/or location information associated with the vehicle 20, its target destinations, or other relevant GPS waypoints.

FIG. 1 additionally illustrates a coolant system 110 configured to cool the main battery 50 of the vehicle 20. The coolant system 110 includes a plurality of fluid passages (illustrated schematically by different line types in FIG. 1, described below) that may flow coolant (e.g., glycol, water, or a combination thereof) to the main battery 50 from heat exchanger 122 (e.g., along flow path 147 indicated by dot-dot-dash lines and as indicated by the corresponding flow direction arrows). The fluid passages may additionally return coolant from the main battery 50 to the heat exchanger 122 (e.g., along flow path 149 indicated by dash-dash-dot lines and as indicated by the corresponding flow direction arrows). The coolant system 110 may flow coolant to and/or from additional components of the vehicle 20 in some examples (e.g., coolant may flow from heat exchanger 122 to motor 24 in order to reduce a temperature of motor 24). Further, in some examples, the coolant system 110 may flow coolant to and/or from components of vehicle 20 not shown by FIG. 1 (e.g., one or more valves, a cabin heat exchanger, etc.). However, for illustrative clarity, the coolant system 110 shown by FIG. 1 illustrates coolant flow between heat exchanger 122 and main battery 50 and further illustrates coolant flow to filter 114, pump 150, heater 116, and chiller 118, without illustrating coolant flow to other components of the vehicle 20.

The coolant system 110 may heat and/or cool the main battery 50. The main battery 50 may include one or more battery packs, and each battery pack may include multiple cells. The battery cells may be separated from each other by heat exchanger fins having narrow cooling channels through which coolant flows to regulate the temperature of each of the battery cells.

The controller 26, which may be a vehicle controller in communication with or integrated with the battery control module, monitors the main battery 50 to determine the state of charge and capacity of the main battery 50. Each cell may have an associated temperature sensor that is configured to measure the cell temperature. The temperature sensor is in communication with the controller 26 such that the controller 26 also monitors the battery temperature by monitoring each battery cell temperature. The controller 26 determines the temperature of the main battery 50 by measuring or estimating the temperatures of the various battery cells.

The controller 26 is also in communication with an ambient temperature sensor 102 on the vehicle. The ambient temperature sensor 102 is configured to measure the temperature of the ambient environment. A cabin temperature sensor is also in communication with the controller 26 and measures the temperature of the vehicle passenger cabin to provide feedback for the HVAC system for climate control of the cabin.

The main battery 50 temperature may be actively regulated using the coolant system 110 that is controlled by controller 26. The temperature of the main battery 50 and of each cell determines the amount of charge that the main battery 50 can accept and the amount of charge that can be used when stored in the main battery 50.

The coolant system 110 thermally manages the main battery 50 to regulate cell temperatures in order to maintain the main battery 50 durability, permit a proper charge, and meet vehicle performance attributes. The coolant system 110 provides active heating or active cooling to the battery cells via convective heat transfer between the cells and the heat exchange fluid (e.g., coolant). The coolant system 110 may be integrated into a vehicle thermal system having both climate control heating and cooling elements and powertrain cooling elements.

The controller 106 is also in communication with an ambient temperature sensor 102 on the vehicle. The ambient temperature sensor 102 is configured to measure the temperature of the ambient environment. A cabin temperature sensor 112 is also in communication with the controller 106 and measures the temperature of the vehicle passenger cabin to provide feedback for the HVAC system for climate control of the cabin.

The main battery 50 temperature may be actively regulated using the coolant system 110 that is controlled by controller 106. The temperature of the main battery 50 and of each cell 104 determines the amount of charge that the main battery 50 can accept and the amount of charge that can be used when stored in the main battery 50.

The coolant system 110 thermally manages the main battery 50 to regulate cell 104 temperatures in order to maintain the main battery 50 durability, permit a proper charge, and meet vehicle performance attributes. The coolant system 110 provides active heating or active cooling to the battery cells 104 via convective heat transfer between the cells 104 and the heat exchange fluid (e.g., coolant). The coolant system 110 may be integrated into a vehicle thermal system having both climate control heating and cooling elements and powertrain cooling elements.

The fluid passages of the coolant system 110 include coolant that may circulate through the cooling channels adjacent to the cells in the battery to heat or cool the main battery 50 (e.g., via convective heat transfer). Pump 150 may circulate coolant in the coolant system 110. Heater 116 may heat the coolant to actively heat the main battery 50 during some conditions (e.g., conditions in which a temperature of the main battery 50 is below a threshold temperature). In some examples, heater 116 may be a heat exchanger with another thermal system in the vehicle to recover waste heat. In other examples, heater 116 may be a stand-alone heater, such as an electrically powered heater (e.g., a positive thermal coefficient (PTC) heater). In the example shown, the coolant system 110 includes a heater bypass passage 151 and heater bypass valve 161. The heater bypass valve 161 may be adjusted to a fully opened position, a fully closed position, or a plurality of positions between the fully opened position and fully closed position by the controller 26. In the fully opened position, a flow of coolant through the heater bypass valve 161 and heater bypass passage 151 may be increased, while a flow of coolant through the heater 116 may be decreased. In the fully closed position, the flow of coolant through the heater bypass valve 161 and heater bypass passage 151 may be decreased, while a flow of coolant through the heater 116 may be increased.

The coolant system 110 may also include a chiller 118. Chiller 118 is a thermal sink that may cool the coolant, and as a result, chiller 118 may actively cool the main battery 50 (e.g., via the coolant). In some examples, coolant cooled by the chiller 118 may additionally flow to other components of the vehicle 20 (e.g., motor 24).

The coolant system 110 also includes the BECM 52. The BECM 52 may also generate heat during use. As such, in some examples, BECM 52 may be configured to be in a heat exchange relationship with coolant flowing through coolant system 110 in order to maintain a temperature of BECM within a suitable operating temperature range. The coolant system 110 may also flow through the battery charger to actively heat or cool the BECM 52 and charging components.

In the example shown, coolant system 110 additionally includes filter 114 disposed upstream of the main battery 50. Filter 114 may be adapted to remove particulates (e.g., dust or other debris) from the coolant flowing through the coolant system 110. By removing particulates from the coolant, filter 114 may reduce a likelihood of the particulates flowing to the main battery 50 via the coolant.

In some examples, the coolant system 110 may additionally regulate the temperature of the electric motor 24. The coolant system 110 may also regulate the temperature for thermal load from the TCM 30 and the DC-to-DC converter 72.

In some examples (e.g., as shown by FIG. 1), the coolant system 110 may additionally include a fluid bypass passage 153 adapted to bypass the heat exchanger 122 (e.g., flow coolant from the main battery 50 and/or chiller 118 to the pump 150 without flowing the coolant through the heat exchanger 122). The bypass fluid passage may include one or more valves controlled by controller 26, such as bypass valve 155. Bypass valve 155 selectively controls fluid flow through the bypass passage 153. The bypass valve 155 may be adjusted to a fully opened position, a fully closed position, or a plurality of positions between the fully opened position and fully closed position by the controller 26. In the fully opened position, a flow of coolant through the bypass valve 155 and bypass passage 153 may be increased, while a flow of coolant through the heat exchanger 122 may be decreased. In the fully closed position, the flow of coolant through the bypass valve 155 and bypass passage 153 may be decreased, while a flow of coolant through the heat exchanger 122 may be increased. In yet other examples, the coolant system 110 may additionally include a chiller bypass passage and chiller bypass valve to enable coolant to flow through bypass passage 153 without flowing through chiller 118.

As coolant flows through the coolant system 110, the main battery 50 may transfer heat to the coolant flowing through the fluid passages such that the main battery 50 is effectively cooled through the heat exchange relationship with the coolant. The coolant may then flow through the heat exchanger 122 and heat the heat exchanger 122, thereby reducing the temperature of the coolant and increasing the temperature of the heat exchanger 122. However, as the temperature of the heat exchanger 122 approaches the temperature of the coolant, the amount of temperature reduction of the coolant resulting from the heat exchange relationship between the coolant and the heat exchanger 122 may be reduced (e.g., the coolant may heat the heat exchanger 122 by a smaller amount, such that the temperature of the coolant decreases at a lower rate).

In order to decrease the temperature of the heat exchanger 122 and increase the rate at which the heat exchanger 122 cools the coolant, the heat exchanger 122 is positioned in an airflow path of a fan impeller 142 of fan 145. Specifically, the fan 145 includes fan shroud 143, with the fan shroud 143 configured to provide support for other components of the vehicle 20, including the heat exchanger 122 (e.g., the heat exchanger 122 is mounted directly to the fan shroud 143 in the airflow path of the fan impeller 142). In the example shown, condenser 123 is mounted to the heat exchanger 122, such that the fan shroud 143 maintains a position of each of the heat exchanger 122 and condenser 123 within the vehicle 20 (e.g., the fan shroud 143 provides structural support for the mounting of the heat exchanger 122 and condenser 123). In some examples (e.g., as shown by FIG. 2), the fan shroud 143 may be directly coupled to a frame bracket of the vehicle 20. The fan 145, heat exchanger 122, and condenser 123 may be referred to herein collectively as a cooling system of the vehicle 20.

The controller 26 may control operation of the fan 145 in order to adjust an amount of cooling of the heat exchanger 122 provided by rotation of the fan impeller 142 (e.g., a speed of the fan 145). As one example, the controller 26 may increase the speed of the fan 145 in order to increase the cooling of the heat exchanger 122 (e.g., increase the airflow generated by the fan impeller 142 in the direction of the heat exchanger 122), and the controller 26 may decrease the speed of the fan 145 in order to decrease the cooling of the heat exchanger 122.

By mounting the heat exchanger 122 directly to the fan shroud 143, an amount of space occupied by the heat exchanger 122 and fan 145 within the vehicle 20 may be reduced. For example, similar to the example described below with reference to FIG. 2, the fan shroud 143 may be angled relative to a vertical direction of the vehicle 20 (e.g., a direction of gravity) such that an amount of space within the vehicle 20 occupied by the fan 145 in the vertical direction is reduced. By mounting the heat exchanger 122 directly to the fan shroud 143, the amount of space within the vehicle 20 occupied by the heat exchanger 122 is similarly reduced. However, because the fan shroud 143 provides structural support for the heat exchanger 122 (e.g., because the heat exchanger 122 is mounted directly to the fan shroud 143), the heat exchanger 122 may alter a resonant frequency and/or one or more harmonic frequencies of the fan 145. The altered frequencies may result in an increased likelihood of noise, vibration, and/or harshness (NVH) during operation of the fan 145. In order to reduce NVH resulting from the configuration of the heat exchanger 122 mounted to the fan shroud 143, the fan shroud 143 may include a plurality of reinforcement features configured to increase a durability of the fan shroud 143 and reduce noise, vibration, and harshness (NVH) resulting from operation of the fan 145. For example, the fan shroud 143 may include a plurality of arms, ribs, and other features configured to reduce vibration associated with the altered frequencies described above. The reinforcement features may, in particular, counteract (e.g., reduce) NVH resulting from the altered resonant and/or harmonic frequencies of the fan 145 (e.g., altered frequencies resulting from the mounting of the heat exchanger 122 to the fan 145). As a result, NVH occurring as a result of operation of the fan 145 may be reduced, and user comfort (e.g., driver comfort) may be increased.

Turning now to FIG. 2, a side view of a vehicle 200 is shown. The vehicle 200 may be the same as the vehicle 20 shown by FIG. 1, in at least one example. The vehicle 200 includes a fan 201 having a fan shroud 202, which may be the same as the fan shroud 143 described above in at least one example. The fan shroud 202 is directly coupled to a lower frame bracket 204 and an upper frame bracket 205 of the vehicle 200, with each of the lower frame bracket 204 and upper frame bracket 205 coupled (e.g., mounted) to a chassis of the vehicle 200 (not shown). Specifically, the fan shroud 202 includes an upper extension 207 adapted to couple to the upper frame bracket 205 and a foot 209 adapted to couple to the lower frame bracket 204. FIG. 2 partially shows an interior portion in a full view of the vehicle 200, with components positioned within the interior portion illustrated in broken lines. FIG. 2 additionally includes an inset 299 showing an enlarged view of a portion of the vehicle 200 including the fan shroud 202. In the inset 299, exterior portions of the vehicle 200 (e.g., outer panels forming a body of the vehicle 200) are shown in broken lines and components positioned within the interior portion of the vehicle 200 (such as the fan shroud 202) are shown in solid lines for clarity.

Vehicle 200 includes a front end 206 and a rear end 208. The fan shroud 202 may be mounted to the lower frame bracket 204 and upper frame bracket 205 at the front end 206 (e.g., closer to the front end 206 than the rear end 208). The vehicle 200 further includes a cabin 210 and wheels 212. In the example shown by FIG. 2, the vehicle 200 is a battery electric vehicle (BEV) including a main battery 214. The main battery 214 may be the same as the main battery 50 shown by FIG. 1 and described above, in at least one example. Because the vehicle 200 is a BEV and does not include an internal combustion engine, a space at the front end 206 of the vehicle 200 conventionally occupied by an engine may instead include a front trunk 216 (referred to herein as frunk 216). Frunk 216 may be utilized as a storage space for items (e.g., cargo) to be transported (e.g., moved) by the vehicle 200, such as tools, spare components, and the like. Fan shroud 202 may additionally occupy a portion of the space conventionally occupied by an engine and may be positioned mounted to the vehicle 200 (e.g., mounted to the upper frame bracket 205 and lower frame bracket 204) at a position vertically beneath the frunk 216, as described below.

In order to illustrate the position of the fan shroud 202 relative to other components of the vehicle 200 (such as frunk 216), FIG. 2 includes vertical axis 218. Vertical axis 218 is an axis parallel to a vertical axis of the vehicle 200 (e.g., an axis extending in a direction from a bottom end 220 of the vehicle 200 to a top end 222 of the vehicle 200), although vertical axis 218 is shown offset from the vehicle 200 in FIG. 2 for illustrative clarity. During some conditions (e.g., conditions in which the wheels 212 of the vehicle 200 are positioned in direct contact with a flat, level ground surface 224, as shown by FIG. 2), the vertical axis 218 may extend in a direction of gravity. Further, horizontal axis 226 is shown aligned with a bottom surface 228 of the vehicle 200 (e.g., positioned within a plane of the bottom surface 228) and extends in a direction from the front end 206 of the vehicle 200 to the rear end 208 of the vehicle 200 (e.g., in a horizontal direction of the vehicle 200). During conditions in which the wheels 212 of the vehicle 200 are positioned on a flat, level ground surface such as ground surface 224, the horizontal axis 226 is offset from the ground surface 224 in the vertical direction and extends in a direction parallel to the ground surface 224 such that the horizontal axis 226 does not intersect a plane of the ground surface 224. In this configuration, the vertical axis 218 is orthogonal to the horizontal axis 226 (as indicated by right angle 230) and is normal to the plane of the ground surface 224. Because vertical axis 218 extends in the vertical direction of the vehicle 200 and horizontal axis 226 extends in the horizontal direction of the vehicle 200, vertical axis 218 is orthogonal to horizontal axis 226 regardless of the condition and/or quality of ground surface 224. However, for illustrative purposes, ground surface 224 is shown parallel to bottom surface 228 of the vehicle 200 in FIG. 2.

Similar to the example described above with reference to the fan shroud 143 shown by FIG. 1, the fan shroud 202 shown by FIG. 2 is mounted to the vehicle 200 in an angled position such that the fan shroud 202 occupies a smaller amount of space within the vehicle 200 in the vertical direction (e.g., the direction of vertical axis 218). To further illustrate the positioning of the fan shroud 143 within the vehicle 200, inset 299 of FIG. 2 shows axis 232 positioned parallel to a bottom surface 234 of frunk 216 and extending outward in the horizontal direction from the bottom surface 234 (e.g., in the direction from the front end 206 of the vehicle 200 to the rear end 208 of the vehicle 200). In this configuration, axis 232 is parallel to horizontal axis 226 and is offset from horizontal axis 226 by a length 236 shown by inset 299. Length 236 corresponds to a distance from the bottom surface 234 of the frunk 216 to the bottom surface 228 of the vehicle 200 in the vertical direction (e.g., the direction of vertical axis 218). The fan shroud 202 is mounted at an angle relative to the vertical direction of the vehicle 200 (e.g., relative to the direction of vertical axis 218) such that the fan shroud 202 does not extend beyond the axis 232 or the horizontal axis 226 in the vertical direction (e.g., the fan shroud 202 does not extend beyond the bottom surface 234 of the frunk 216 or the bottom surface 228 of the vehicle 200 in the vertical direction of vertical axis 218).

Similar to the example shown by FIG. 1 and described above, the fan shroud 202 is configured to house a fan impeller within a main opening (not shown by FIG. 2). An axis of rotation of the fan impeller is illustrated by rotation axis 238 shown by inset 299. The rotation axis 238 is non-orthogonal to each of vertical axis 218, horizontal axis 226, and axis 232, and is coaxial with a normal of the main opening of the fan shroud 202 (e.g., parallel and in a same position as the normal of the opening). Additionally, the rotation axis 238 is not parallel to any of vertical axis 218, horizontal axis 226, and axis 232. In some examples, a direction of airflow through the fan shroud 202 may correspond to the direction of the rotation axis 238 (e.g., the fan impeller housed by the fan shroud 202 may rotate around rotation axis 238, which may draw air into the fan shroud 202 and may output air from the fan shroud 202 in a direction parallel to the rotation axis 238, as indicated by airflow arrows 240).

The fan shroud 202 includes a first surface 242 and an opposing, second surface 244. The first surface 242 is a surface that may include a main opening of the fan shroud, with the fan impeller configured to seat within the main opening and rotate within the main opening. In this configuration, the first surface 242 is positioned at an inlet end of the fan shroud 202, with the inlet end being an end at which air enters into the fan shroud 202 due to the rotation of the fan impeller. The second surface 244 is positioned at an opposing, outlet end of the fan shroud 202, with the outlet end being an end at which air exits the fan shroud 202 (e.g., flows out of the fan shroud 202) due to the rotation of the fan impeller.

The fan shroud 202 is configured such that a heat exchanger 246 may be mounted directly to the fan shroud 202 at the first surface 242 of the fan shroud 202 and separated from a frame of the vehicle 200, including upper frame bracket 205 and lower frame bracket 204, by the fan shroud 202 (e.g., the heat exchanger 246 may be supported entirely by the fan shroud 202 and may not couple to any portion of the vehicle frame, including the frame brackets). The heat exchanger 246 shown by FIG. 2 may be the same as the heat exchanger 122 described above with reference to FIG. 1, in at least one example. In the configuration shown, the heat exchanger 246 is positioned at the inlet end of the fan shroud 202 and may be directly coupled to the fan shroud 202 via one or more mating features 248 (e.g., clips) of the heat exchanger 246 adapted to lock to counterpart mating features (e.g., protrusions) of the fan shroud 202. Further, in some examples, a condenser 250 may couple directly to the heat exchanger 246 via a plurality of mating features (e.g., protrusions) adapted to engage with counterpart mating features of the heat exchanger 246 (e.g., clips), with the fan shroud 202 adapted to support and maintain the position of both of the heat exchanger 246 and condenser 250 within the vehicle 200 (e.g., fan shroud 202 may separate the condenser 250 from the vehicle frame, similar to the separation of the heat exchanger 246 from the vehicle frame by the fan shroud 202).

The heat exchanger 246 and condenser 250 may each be relatively flat and rectangular in some examples (e.g., the heat exchanger 246 and condenser 250 may each be shaped as a rectangular parallelepiped). In such examples, the heat exchanger 246 may include a first exterior surface positioned in direct contact with the first surface 242 of the fan shroud 202 and an opposing, parallel second exterior surface offset from the first exterior surface, with a thickness of the heat exchanger 246 being a length between the first exterior surface and second exterior surface. The first exterior surface and second exterior surface may each be parallel to the first surface 242 of the fan shroud 202. The condenser 250 may include a first outer surface and an opposing, parallel second outer surface, with the first outer surface positioned in direct contact with the second exterior surface of the heat exchanger 246 during conditions in which the heat exchanger 246 is coupled to the fan shroud 202 and the condenser 250 is coupled to the heat exchanger 246. In this configuration, each of the first surface 242 of the fan shroud 202, second surface 244 of the fan shroud 202, first and second exterior surfaces of the heat exchanger 246, and first and second outer surfaces of the condenser 250 may be positioned parallel to each other, as illustrated by parallel axes 252, 254, and 256 shown by inset 299 of FIG. 2.

In the configuration shown by FIG. 2, axis 252 is positioned in a plane of the second surface 244 of the fan shroud 202, axis 254 is positioned in a plane of the first exterior surface of the heat exchanger 246, and axis 256 is positioned in a plane of the first outer surface of the condenser 250, with each of the axes 252, 254, and 256 being parallel to each other and angled relative to the horizontal axis 226 by angle 260. In this configuration, the rotation axis 238 is orthogonal to each of the axes 252, 254, and 256. In some examples, the angle 260 may be an amount of angle between 40 degrees and 50 degrees (e.g., 45 degrees). In other examples, the angle 260 may be an amount of angle between a different range (e.g., between 30 degrees and 60 degrees), such that the axes 252, 254, and 256 are each substantially angled relative to both the horizontal axis 226 and vertical axis 218 (e.g., angled relative to each of the horizontal axis 226 and vertical axis 218 by more than 10 degrees). However, by configuring the angle 260 to be approximately 45 degrees, the fan shroud 202 may be positioned at the location vertically below the frunk 216 while maintaining a size of the fan 201 (e.g., not reducing the size of the fan 201 to accommodate the frunk 216), as described further below.

By mounting the fan shroud 202 within the vehicle 200 in the angled position via the upper extension 207 coupled to the upper frame bracket 205 and the foot 209 coupled to the lower frame bracket 204 as described above, the fan shroud 202 may be positioned vertically below the frunk 216 in order to reduce an amount of space occupied by the fan shroud 202 and increase an amount of space occupied by the frunk 216. Increasing the amount of space occupied by the frunk 216 may increase a storage capacity of the frunk 216, enabling a larger amount of cargo to be transported by the vehicle 200 via the frunk 216. Further, the upper frame bracket 205 and the foot 209 may increase a stability of the fan shroud 202 during conditions in which the fan shroud 202 is mounted to the vehicle 200, and the fan shroud 202 may provide structural support for the heat exchanger 246 and condenser 250. By increasing the stability of the fan shroud 202 via the upper frame bracket 205 and the foot 209, an amount of weight that may be applied to the fan shroud 202 by other components (e.g., the heat exchanger 246 and condenser 250) may be increased. Additionally, in the angled position shown by FIG. 2 with the rotation axis 238 of the fan impeller extending vertically upward toward the frunk 216 and the front end 206 of the vehicle 200 at the inlet end of the fan 201, an amount of airflow to the fan impeller may be increased. For example, air may flow into the front end 206 of the vehicle 200 via a grill positioned at the front end 206 of the vehicle 200 upstream of the fan impeller housed within the fan shroud 202. As the vehicle 200 is driven, a larger amount of ambient air may be drawn through the grill at the front end 206 (e.g., flow through the grill) at locations vertically above the bottom surface 228 of the vehicle 200 relative to an amount of air drawn through the grill at locations vertically below the bottom surface 228 of the vehicle 200. By configuring the fan shroud 202 to be coupled to the vehicle 200 in the angled position, the larger amount of air flowing into the front end of the vehicle 200 vertically above the bottom surface 228 is directed into the fan 201. This configuration increases airflow to the fan 201 relative to configurations in which the rotation axis 238 of the fan impeller extends vertically downward toward the ground surface 224 at the inlet end of the fan 201, and an amount of cooling of vehicle components (e.g., heat exchanger 246 and condenser 250) provided by the fan 201 may be increased.

As a result of the configuration described above, the fan shroud 202 may support the weight of each of the heat exchanger 246 and condenser 250 (e.g., via the upper extension 207, foot 209, and counterpart mating features of the fan shroud 202) to enable the heat exchanger 246 and condenser 250 to be positioned in the configuration shown by FIG. 2 and described above. Specifically, the heat exchanger 246 may be positioned at the inlet end of the fan shroud 202 between the condenser 250 and the fan shroud 202 in the direction of the rotation axis 238 (e.g., upstream of the fan shroud 202 in the direction of airflow through the fan shroud 202), which may increase a cooling of each of the heat exchanger 246 and condenser 250 by the fan 201 (e.g., relative to configurations in which the heat exchanger 246 and condenser 250 are in a different arrangement relative to the inlet end of the fan shroud 202, such a configuration in which each of the heat exchanger 246 and condenser 250 are downstream of the outlet end of the fan shroud 202, or a configuration in which one of the heat exchanger 246 or condenser 250 is downstream of the outlet end of the fan shroud 202).

Additionally, by mounting the fan shroud 202 within the vehicle 200 in the angled position, the fan shroud 202 may be positioned at the location vertically below the frunk 216 without reducing a size of the fan 201. For example, a length 258 of the fan shroud 202 may be larger than the length 236 between the bottom surface 234 of frunk 216 and the bottom surface 228 of the vehicle 200. Without mounting the fan shroud 202 to the vehicle 200 in the angled position described above, the fan shroud 202 may not fit within the space vertically beneath the frunk 216. As one example, if the position of the fan shroud 202 were altered such that the length 258 of the fan shroud 202 were parallel with the length 236, the fan shroud 202 may not fit entirely within the space between the bottom surface 234 of frunk 216 and the bottom surface 228 of the vehicle 200. However, mounting the fan shroud 202 to the vehicle 200 in the angled position via the upper extension 207 and foot 209 enables the fan shroud 202 to be positioned vertically beneath the frunk 216 while maintaining a size of the components of the fan 201 relative to fans that are not mounted in the angled position (e.g., without decreasing the size of the fan impeller). As a result, the fan 201 may have an increased power and/or air flow capability (e.g., air flow rate) relative to fans that may be reduced in size to fit beneath the frunk 216.

Similar to the example described above with reference to the fan shroud 143 and heat exchanger 122 of FIG. 1, coupling the heat exchanger 246 to the fan shroud 202 in the configuration described above may alter NVH characteristics of the fan 201 by a first amount, the NVH characteristics resulting from operation of the fan 201 (e.g., rotation of the fan impeller). For example, mounting the heat exchanger 246 to the fan shroud 202 may alter a resonant frequency and/or one or more harmonic frequencies of the fan 201 (e.g., shift the frequencies by a first amount). Additionally, coupling the condenser 250 to the heat exchanger 246 while the heat exchanger 246 is coupled to the fan shroud 202 may further alter the NVH characteristics of the fan 201 (e.g., shift the resonant frequency and/or one or more harmonic frequencies of the fan 201 by a second amount). The NVH characteristics of the fan 201 may additionally be altered due to the angled position of the fan shroud 202 (e.g., the angled position of the fan shroud 202 may alter the NVH characteristics and shift the resonant frequency and/or one or more harmonic frequencies of the fan by a third amount). The angled position, in combination with the mounting of the heat exchanger 246 to the fan shroud 202 and the mounting of the condenser 250 to the heat exchanger 246, may result in substantially different NVH characteristics relative to fans that are not mounted in the angled position and do not provide structural support for components such as the heat exchanger and condenser (e.g., the combined shift in frequencies resulting from the angled position and mounting of the components to the fan shroud 202 may result in an overall shift or deviation in frequencies greater than 10% relative to un-shifted frequencies). Additionally, the NVH characteristics may be further altered due to positioning heat exchanger 246 in direct contact with the fan shroud 202, and positioning the condenser 250 in direct contact with the heat exchanger 246, upstream of the inlet end of the fan shroud 202. For example, because each of the heat exchanger 246 and condenser 250 may be shaped as a rectangular parallelepiped and positioned parallel with the first surface 242 of the fan shroud 202 as described above, the heat exchanger 246 and condenser 250 may alter NVH associated with one or more harmonic frequencies of the fan 201 (e.g., concentrate an oscillation of the fan 201 at one or more frequencies).

In order to reduce NVH (e.g., reduce the shift in NVH characteristics and/or reduce an amount of NVH) resulting from coupling the heat exchanger 246 to the fan shroud 202, coupling the condenser 250 to the heat exchanger 246, and positioning the assembly in the angled position, the fan shroud 202 may include a plurality of reinforcement features (which may be referred to herein as NVH reduction features). The reinforcement features may, in particular, counteract NVH resulting from the altered resonant and/or harmonic frequencies of the fan 201 in the configuration described above (e.g., with the heat exchanger 246 coupled to the fan shroud 202, and the condenser 250 coupled to the heat exchanger 246). Examples of reinforcement features that may be included by the fan shroud 202 are described below with reference to FIGS. 3-6.

FIGS. 3-6 each show different views of a fan 300 having a fan shroud 302 with integrated structural support (e.g., an integrated support structure), similar to the examples described above with reference to FIGS. 1-2. In at least one example, the fan shroud 302 may be the fan shroud 143 described above with reference to FIG. 1. In another example, the fan shroud 302 may be the fan shroud 202 described above with reference to 202. In each of FIGS. 3-6, reference axes 399 are included for relative comparison of the different views. The integrated support structure of the fan shroud 302 may refer collectively to a plurality of reinforcement features (e.g., arms, arm supports, ridges, etc.) and mating features configured to provide support for mounting of a heat exchanger to the fan shroud 302 and configured to reduce NVH associated with operation of fan 300, as described further below. The plurality of reinforcement features and/or mating features may be formed together (e.g., molded together) with the fan shroud 302 such that the reinforcement features and mating features are integrated with the fan shroud 302 as a single unit (e.g., formed of a same material as the fan shroud 302).

Figure 3:
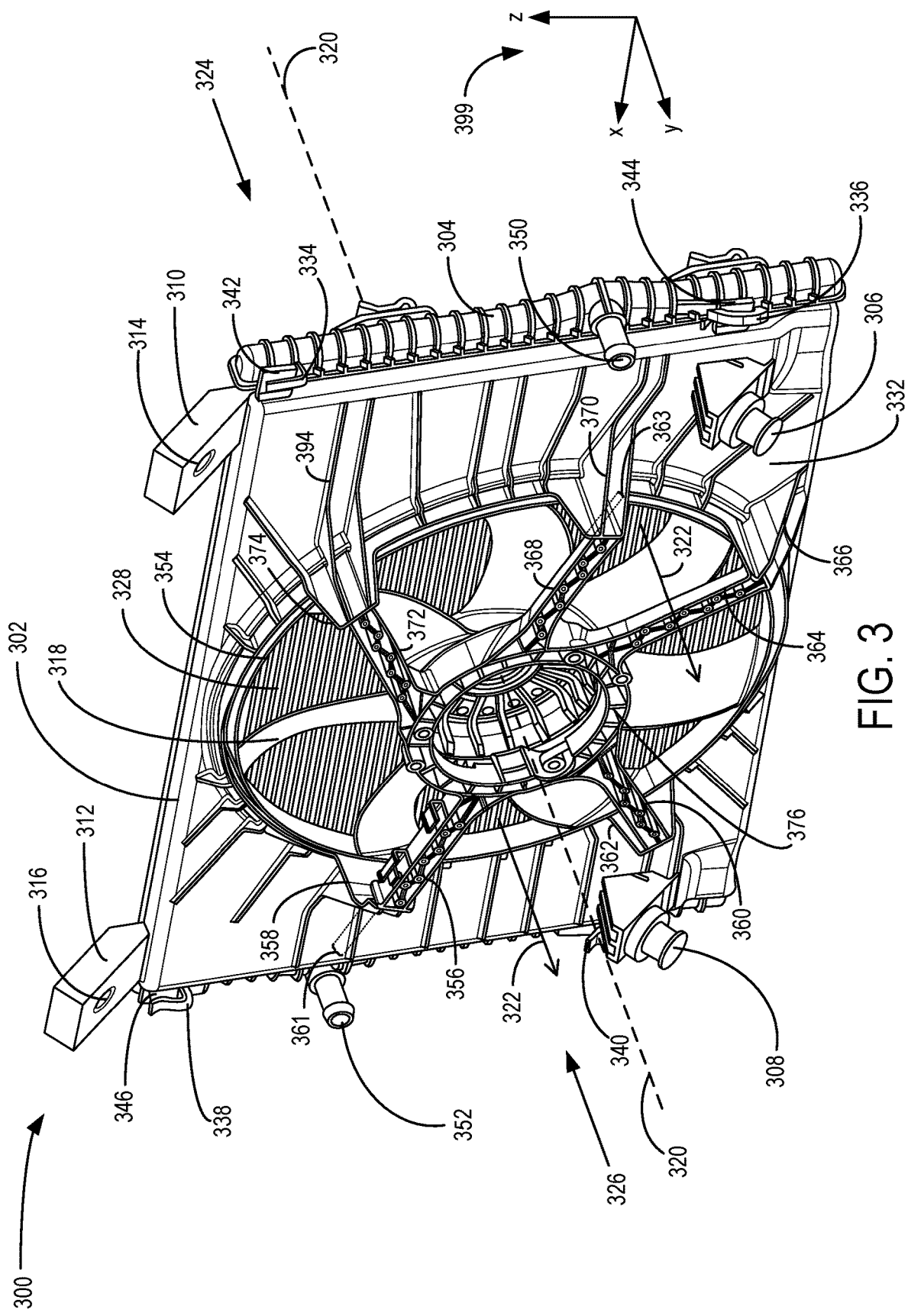
FIG. 3 shows a rear perspective view of a fan shroud including an integrated support structure, with the fan shroud supporting a heat exchanger.

FIG. 3 shows a front perspective view of the fan shroud 302. In the example shown by FIGS. 3-6, a heat exchanger 304 is shown mounted to the fan shroud 302. In at least one example, the heat exchanger 304 may be the heat exchanger 122 shown by FIG. 1 and described above, or the heat exchanger 246 shown by FIG. 2 and described above. Additionally, FIG. 5 indicates a relative position of a condenser 307 (shown in broken lines) that may be mounted to the heat exchanger 304 via a plurality of condenser mating features (e.g., clips, protrusions, and the like, similar to the example described above with reference to FIG. 2) adapted to engage with counterpart mating features 309 of the heat exchanger 304. In at least one example, the condenser 307 may be the condenser 123 shown by FIG. 1 and described above, or the condenser 250 shown by FIG. 2 and described above.

The fan shroud 302 includes several features similar to those described above with reference to the fan shroud 143 shown by FIG. 1 and the fan shroud 202 shown by FIG. 2. For example, the fan shroud 302 includes a first foot 306 and a second foot 308 joined directly to second surface 332 of the fan shroud 302. First foot 306 and second foot 308 may each be similar to the foot 209 described above with reference to FIG. 2. The first foot 306 and second foot 308 may each be configured to couple to a lower frame bracket of a vehicle, such as the lower frame bracket 204 of vehicle 200 described above with reference to FIG. 2. The fan shroud 302 additionally includes a first upper extension 310 and a second upper extension 312, which may each be similar to the upper extension 207 described above with reference to FIG. 2. The first upper extension 310 and second upper extension 312 may each couple to an upper frame bracket of a vehicle, such as the upper frame bracket 205 described above with reference to FIG. 2. As one example, first upper extension 310 includes a first aperture 314 and second upper extension 312 includes a second aperture 316. The first aperture 314 and second aperture 316 may each be adapted to receive respective fasteners (e.g., bolts) in order to couple to the upper frame bracket of the vehicle.

The fan shroud 302 is configured to house a fan impeller 318 (e.g., an axial flow impeller configured to flow air in a direction parallel to a rotation axis 320 of the impeller), similar to the fan impellers described above. Fan impeller 318 may rotate around rotation axis 320, similar to the rotation axis 238 described above with reference to FIG. 2, in order to drive ambient air through the fan shroud 302 from an inlet end 324 of the fan 300 to an outlet end 326 of the fan 300 (e.g., as indicated by airflow direction 322, parallel to rotation axis 320). The rotation axis 320 is arranged parallel to a normal of main opening 354, such that the rotation axis 320 is normal to the main opening 354. Further, the rotation axis 320 is centered at the main opening 354 (e.g., extends through center 382 of the main opening 354). Flowing the air through the fan shroud 302 in the direction indicated by airflow direction 322 (e.g., from inlet end 324 to outlet end 326) flows the air through the heat exchanger 304 and across a plurality of heat transfer features 328 (e.g., fins and/or coolant tubes) of the heat exchanger 304. The heat exchanger 304 may receive coolant at inlet port 350 and may output coolant at outlet port 352, similar to the coolant flow through the heat exchanger 122 shown by FIG. 1 and described above. For example, the plurality of heat transfer features 328 may be coolant tubes, and the coolant may flow through the coolant tubes from the inlet port 350 to the outlet port 352. The inlet end 324 and outlet end 326 of the fan 300 may be similar to the inlet end and outlet end described above with reference to FIG. 2. For example, the inlet end 324 may be positioned closer to a front end of the vehicle (e.g., front end 206 shown by FIG. 2 and described above) during conditions in which the fan shroud 302 is mounted to the vehicle.

The fan shroud 302 is configured to mount to the vehicle in an angled position, similar to the examples described above. Specifically, during conditions in which the fan shroud 302 is mounted to the vehicle (e.g., via the first upper extension 310, second upper extension 312, first foot 306, and second foot 308), the rotation axis 320 is non-orthogonal to each of a horizontal axis and a vertical axis of the vehicle (e.g., horizontal axis 226 and vertical axis 218, respectively, shown by FIG. 2 and described above), and the rotation axis is not parallel with either of the horizontal axis 226 or vertical axis 218 and is angled relative to ground surface 224. During conditions in which the fan shroud 302 is mounted to the vehicle, second surface 332 of the fan shroud 302 (shown by FIG. 3) is positioned closer to a bottom end of the vehicle (e.g., similar to bottom end 220 shown by FIG. 2 and described above) than opposing, parallel first surface 330 (shown by FIG. 5), with the first surface 330 and second surface 332 joined together at first end 385 and opposing, second end 387. Main opening 354 of the fan shroud 302 extends from the first surface 330 to the second surface 332 and is opened at the first surface 330 and second surface 332, with the rotation axis 320 arranged orthogonal to a direction from the first end 385 to the second end 387.

The heat exchanger 304 shown by FIGS. 3-6 includes a plurality of mating features (e.g., clips) adapted to couple with corresponding mating features (e.g., protrusions) of the fan shroud 302 extending from the first end 385 and second end 387 of the fan shroud 302 in order to secure (e.g., mount) the heat exchanger 304 to the fan shroud 302 in a position such that the heat exchanger 304 engages directly with the fan shroud 302 upstream of fan impeller 318 in airflow direction 322 (e.g., the heat exchanger 304 is positioned directly against the first surface 330 and extends across main opening 354, such that the plurality of heat transfer features 328 extend across the main opening 354 at the first surface 330). The condenser 307 mounts to the heat exchanger 304 upstream of the heat exchanger 304 in the airflow direction 322 (e.g., upstream of the heat transfer features 328 of the heat exchanger 304). In the example shown by FIGS. 3-6, the heat exchanger 304 includes first mating feature 334, second mating feature 336, third mating feature 338, and fourth mating feature 340 adapted to couple with first counterpart mating feature 342, second counterpart mating feature 344, third counterpart mating feature 346, and fourth counterpart mating feature 348 (respectively) of the fan shroud 302. In other examples, the heat exchanger 304 may include a different number of mating features (e.g., five) and the fan shroud 302 may include a corresponding number of counterpart mating features. The first mating feature 334, second mating feature 336, third mating feature 338, and fourth mating feature 340 may be referred to herein collectively as a plurality of heat exchanger mating features. The first counterpart mating feature 342, second counterpart mating feature 344, third counterpart mating feature 346, and fourth counterpart mating feature 348 may be referred to herein collectively as a plurality of fan shroud mating features.

Figure 5:
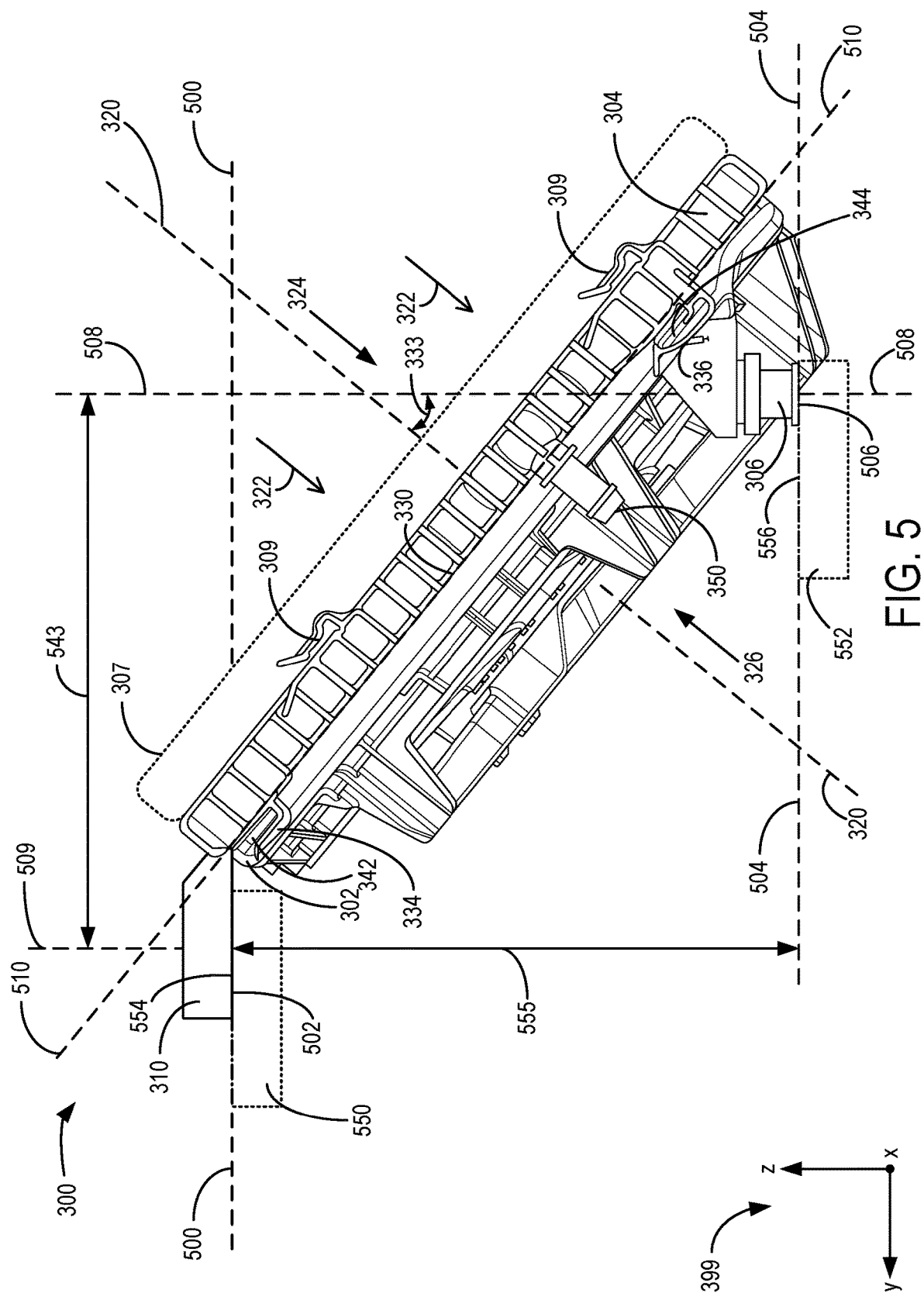
FIG. 5 shows a side view of the fan shroud and heat exchanger of FIGS. 3-4.
Figure 6:
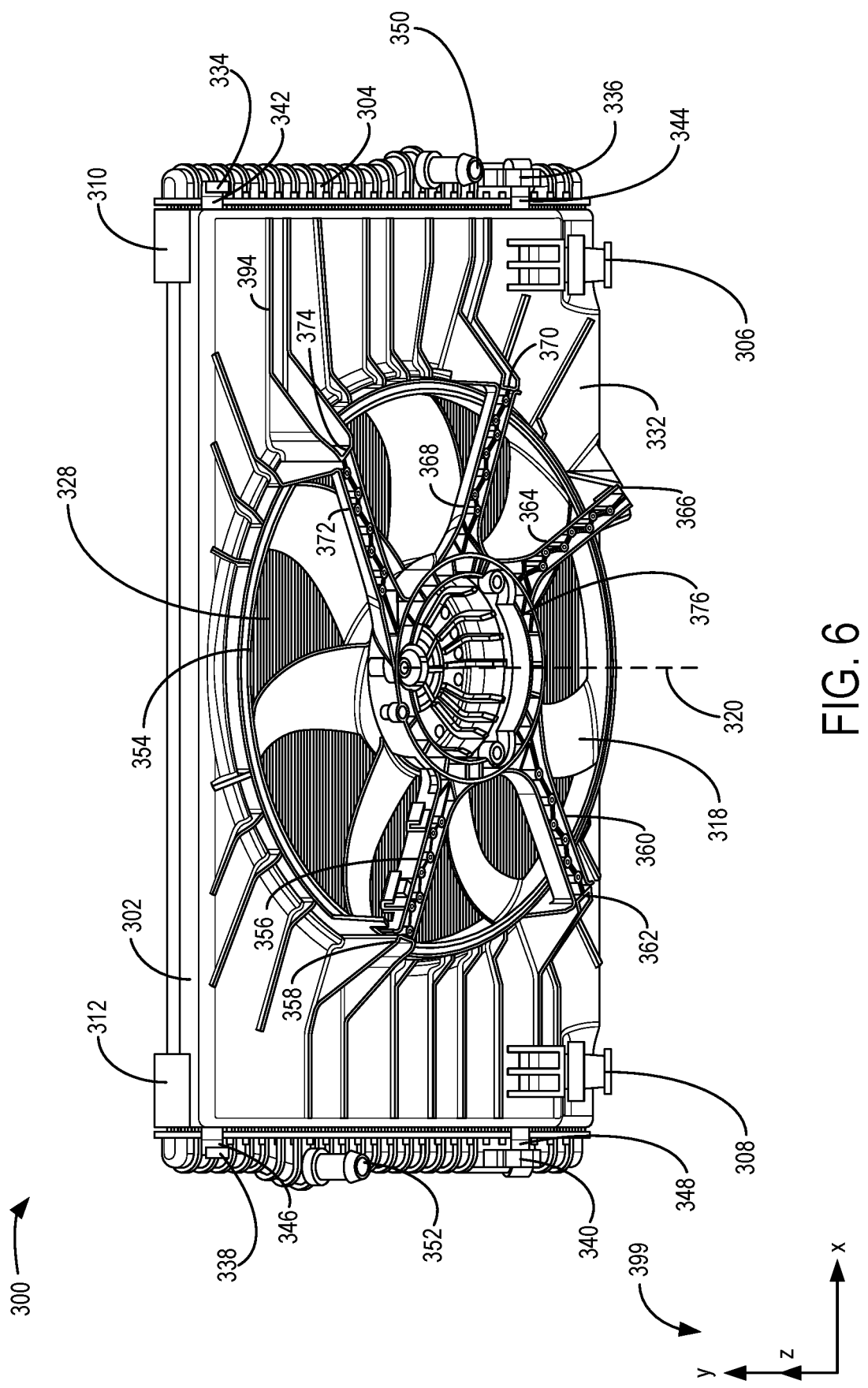
FIG. 6 shows a rear perspective view of the fan shroud and heat exchanger of FIGS. 3-5.

Referring to FIG. 5, a plurality of axes are shown to illustrate the relative arrangement of the components of the fan shroud 302 and the heat exchanger 304. Axis 500 is shown positioned along a bottom surface 502 of the first upper extension 310 (e.g., positioned within a plane of the bottom surface 502), and during conditions in which the fan 300 is mounted to a vehicle (e.g., by coupling the first upper extension 310 to an upper frame bracket of a vehicle, such as upper frame bracket 205 of vehicle 200 shown by FIG. 2), the axis 500 may be positioned parallel to a horizontal axis of the vehicle (e.g., horizontal axis 226 shown by FIG. 2 and described above). For example, FIG. 5 illustrates a relative position of an upper frame bracket 550 and a lower frame bracket 552 of a vehicle during conditions in which the fan shroud 302 is mounted to the vehicle in the angled position. In this configuration, the bottom surface 502 of the first upper extension 310 is positioned in direct contact with a top surface 554 of the upper frame bracket 550 (e.g., the bottom surface 502 is positioned directly in face-sharing contact against the top surface 554 with no other components positioned therebetween). As described above, the first upper extension 310 includes the first aperture 314 (shown by FIG. 3). The first aperture 314 is formed at least in part by the bottom surface 502 (e.g., opens at the bottom surface 502) and extends through a thickness of the first upper extension 310 in a normal direction of the bottom surface 502 (e.g., the direction of axis 509). Coupling the first upper extension 310 to the upper frame bracket 550 may include inserting a fastener (e.g., bolt) through each of the first aperture 314 and upper frame bracket 550 in the normal direction of the bottom surface 502 (e.g., along axis 509) in order to maintain the position of the first upper extension 310 relative to the upper frame bracket 550.

Further, a bottom surface 506 of the first foot 306 is positioned in direct contact with a top surface 556 of the lower frame bracket 552. In at least one example, the upper frame bracket 550 and lower frame bracket 552 may be the same as the upper frame bracket 205 and lower frame bracket 204 shown by FIG. 2 and described above. Further, in some examples, the upper frame bracket 550 and lower frame bracket 552 may each extend across a width of the vehicle (e.g., a direction from a drivers side of the vehicle to a passenger side of the vehicle, which, with regard to the example shown by FIG. 2, may be a direction perpendicular to each of the horizontal axis 226 of the vehicle and the vertical axis 218 of the vehicle).

Axis 504 is arranged parallel to axis 500 and is positioned along the bottom surface 506 of the first foot 306 (e.g., positioned within a plane of the bottom surface 506). Axis 508 is orthogonal to each of the axis 500 and axis 504 and extends through the first foot 306 in a normal direction of the bottom surface 506. The bottom surface 506 of the first foot 306 is parallel with the bottom surface 502 of the first upper extension 310 such that the axis 508 is arranged parallel to axis 509, and each of axis 508 and axis 509 are non-orthogonal relative to axis 320. Axis 320 is normal relative to the main opening 354 and extends at an angle 333 relative to axis 508, where the angle 333 is an amount of angle between 40 degrees and 50 degrees at least in one example. Axis 320 may extend at an angle approximately the same as angle 333 relative to axis 509, in some examples (e.g., an angle between axis 508 and axis 320 may be a same amount of angle as an angle between axis 509 and axis 320). In this configuration, the first upper extension 310 is offset from the first foot 306 by approximately a same length in both a direction of the normal of the bottom surface 502 (e.g., length 555 parallel to axis 509) and a direction orthogonal to the normal of the bottom surface 502 (e.g., parallel to axis 504). For example, the length 555 and length 543 between axis 509 and 508 in the direction orthogonal to the normal of the bottom surface 502 may be approximately a same amount of length, in at least one example. The first upper extension 310 is offset from the first foot 306 in the direction orthogonal to the normal of the bottom surface 506 and away from the main opening 354 by the length 543. In this configuration, during conditions in which the fan shroud 302 is coupled to the vehicle, a distance of the first foot 306 from the front end of the vehicle is less than a distance of the first upper extension 310 from the front end (e.g., first foot 306 is positioned closer to the front end). The first foot 306 extends outward from the second surface 332 and terminates at an angle between 40 and 50 degrees relative to the rotation axis 320, in some examples (e.g., the normal of the bottom surface 506, or terminating surface, of the first foot 306 may be arranged at an angle between 40 and 50 degrees relative to the rotation axis 320, as indicated by axis 508 and angle 333). In some examples, the length 543 is greater (e.g., a larger amount of length) than a radius 343 of the main opening 354 (shown by FIG. 4).

During conditions in which the fan 301 is mounted to the vehicle, the axis 508 may be positioned parallel to a vertical axis of the vehicle (e.g., vertical axis 218 shown by FIG. 2 and described above). Further, axis 510 is positioned at an angle to each of axis 500, axis 504, and axis 508, and axis 510 extends along the first surface 330 of the fan shroud 302 (e.g., axis 510 is positioned within a plane of the first surface 330). In at least one example, the axis 510 is similar to the axis 254 described above with reference to FIG. 2. For example, during conditions in which the fan shroud 302 is mounted to the vehicle, the axis 510 may be angled by 45 degrees relative to the vertical axis and horizontal axis of the vehicle.

The fan shroud 302 includes several reinforcement features adapted to increase a durability of the fan shroud 302 and reduce an NVH associated with operation of the fan 301, similar to the examples described above with reference to FIGS. 1-2. For example, similar to the examples described above, mounting the fan shroud 302 to the vehicle in the angled position (e.g., via the first upper extension 310, second upper extension 312, first foot 306, and second foot 308), mounting the heat exchanger 304 to the fan shroud 302, and coupling the condenser 307 to the heat exchanger 304 may alter the NVH characteristics of the fan 301. The reinforcement features of the fan shroud 302 may compensate for the altered NVH characteristics (e.g., reduce the amount of NVH and/or an amount by which the NVH characteristics are shifted).

In the example shown by FIGS. 3-6, the reinforcement features of the fan shroud 302 include a plurality of arms extending across a main opening 354 of the fan shroud 302 (with the fan impeller 318 housed within the main opening 354) and joined to the second surface 332 at the outlet end 326 via respective arm supports, and a plurality of ridges 394 extending from the main opening 354 across the second surface 332 at the outlet end 326. Specifically, in the example shown by FIGS. 5-6, the fan shroud 302 includes a first arm 356 joined to the second surface 332 by a first arm support 358, a second arm 360 joined to the second surface 332 by a second arm support 362, a third arm 364 joined to the second surface 332 by a third arm support 366, a fourth arm 368 joined to the second surface 332 by a fourth arm support 370, and a fifth arm 372 joined to the second surface 332 by a fifth arm support 374. The arms and arm supports may be formed integrally with the second surface 332 in at least one example (e.g., molded together with the second surface 332 as a single, continuous unit), with the arm supports extending outward from the second surface 332 parallel with the rotation axis 320.

Figure 4:
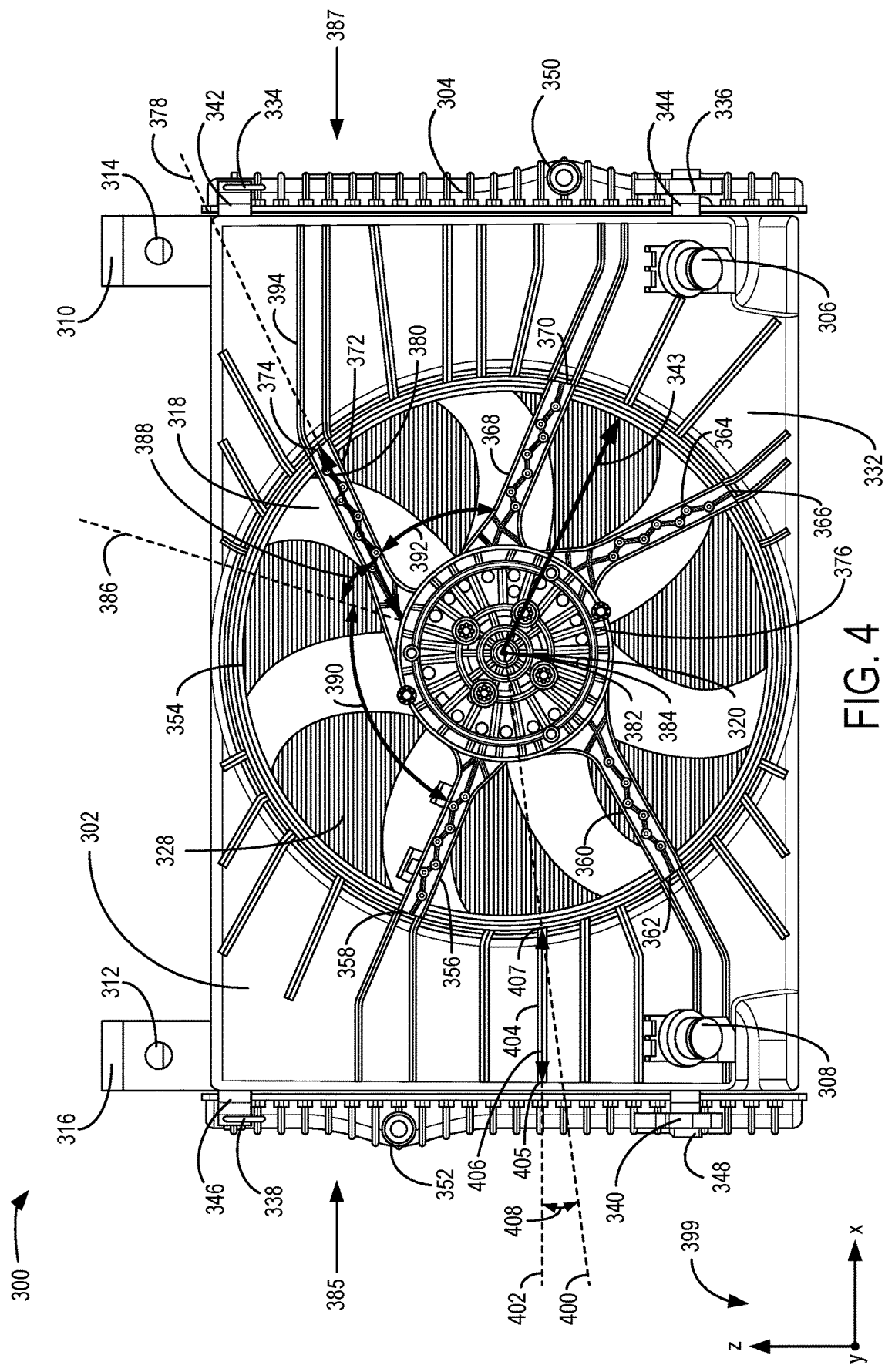
FIG. 4 shows a rear view of the fan shroud and heat exchanger of FIG. 3.

The arms are positioned in an asymmetrical arrangement around the main opening 354 and are each joined to an annular support 376 centered at center 382 of the main opening 354, as illustrated by FIG. 4. Each of the arms extends from the annular support 376 to a perimeter of the main opening 354 (e.g., to the corresponding arm supports positioned at the perimeter of the main opening 354). To illustrate the asymmetrical arrangement of the arms, FIG. 4 includes axis 378 extending along a length 380 of the fifth arm 372. The axis 378 (and the fifth arm 372) extend outward from the main opening 354 in a direction that is not radial relative to the center 382 of the main opening 354 and a center 384 of the annular support 376. For example, radial axis 386 is arranged radially relative to the center 384 of the annular support 376 and center 382 of the main opening 354 and intersects a location at which the fifth arm 372 joins to the annular support 376. However, although axis 378 intersects the same location at which the fifth arm 372 joins to the annular support 376, axis 378 is not parallel relative to radial axis 386 (e.g., axis 378 is angled by angle 388 relative to radial axis 386, where angle 388 may be an angle of at least 5 degrees, such as 30 degrees).

Fifth arm 372 is described above as an example of the asymmetrical arrangement of the arms. However, each of the other arms (e.g., first arm 356, second arm 360, third arm 364, and fourth arm 368) may also be arranged asymmetrically around the main opening 354. For example, for each of the first arm 356, second arm 360, third arm 364, and fourth arm 368, a length of the arm may extend from the annular support 376 in a direction that is not radial relative to the center 382 of the main opening 354 and the center 384 of the annular support 376. Additionally, for each arm, an angle (analogous to angle 388) between a respective first direction and second direction may be different, the first direction being a direction of extension of the arm from the annular support (analogous to axis 378), and the second direction being a radial direction from the center 382 and center 384 through a location at which the arm joins to the annular support 376 (analogous to radial axis 386). In this configuration, each of the arms (e.g., first arm 356, second arm 360, third arm 364, fourth arm 368, and fifth arm 372) may extend from the annular support 376 by a different angle relative to the respective radial direction of center 382, center 384, and rotation axis 320. For example, first arm 356 may extend from the annular support 376 at an angle of 9 degrees relative to a respective radial direction of rotation axis 320, second arm 360 may extend from the annular support 376 at an angle of 17 degrees relative to a respective radial direction of rotation axis 320, third arm 364 may extend from the annular support 376 at an angle of 6 degrees relative to a respective radial direction of rotation axis 320, and fourth arm 368 may extend from the annular support 376 at an angle of 21 degrees relative to a respective radial direction of rotation axis 320. The radial directions described above each intersect the location at which the respective arm joins to the annular support 376, similar to the example of fifth arm 372 described above.

Additionally, each of the arms (e.g., first arm 356, second arm 360, third arm 364, fourth arm 368, and fifth arm 372) may be spaced apart from each adjacent arm by a different amount. For example, an amount of angle 392 between the fourth arm 368 and fifth arm 372 around a perimeter of the annular support 376 may be less than an amount of angle 390 between the fifth arm 372 and the first arm 356 around the perimeter of the annular support 376, with each of the first arm 356 and fourth arm 368 being adjacent to the fifth arm 372. Further, an angle between fourth arm 368 and third arm 364 may be different than an angle between third arm 364 and second arm 360, and so forth.

In some examples, at least one of the arms may have a different thickness relative to the other arms. As an example, FIG. 3 illustrates a thickness 361 of first arm 356 in a direction parallel with the rotation axis 320 and a thickness 363 of the fourth arm 368 in the direction of the rotation axis 320. The thickness 361 of the first arm 356 is greater than the thickness 363 of the fourth arm 368. In at least one example, the thickness 361 of the first arm 356 may be double the thickness 363 of the fourth arm 368. Although the thickness 361 of the first arm 356 and the thickness 363 of the fourth arm 368 are described above as examples, in some examples the thickness of the second arm 360, third arm 364, and/or fifth arm 372 may be different relative to each other or one or more of the other arms. For example, first arm 356 may have a thickness 361 (e.g., a first thickness), second arm 360 may have a second thickness, third arm 364 may have a third thickness, fourth arm 368 may have thickness 363 (e.g., a fourth thickness), and fifth arm 372 may have a fifth thickness, with the first, second, third, fourth, and fifth thicknesses being different relative to each other.

Arranging the arms asymmetrically as described above may reduce an NVH of the fan 301 resulting from the mounting of the fan shroud 302 in the angled position, as well as NVH resulting from the mounting of the heat exchanger 304 to the fan shroud 302 and the coupling of the condenser 307 to the heat exchanger 304. For example, the asymmetric arrangement of the arms may reduce noise resulting from harmonic frequencies during operation of the fan 301. Additionally, configuring the arms to have different thicknesses as described above may further reduce noise resulting from the harmonic frequencies and/or increase a durability of the fan shroud 302.

The plurality of ridges 394 extending from the main opening 354 across the second surface 332 at the outlet end 326 may additionally reduce the NVH of the fan 301 and increase a durability of the fan shroud 302. The ridges 394 are arranged asymmetrically relative to the main opening 354. For example, one or more of the ridges 394 may extend from the main opening 354 in directions that are not radial relative to the rotation axis 320, center 382, and center 384. In order to further illustrate the asymmetrical arrangement of the ridges 394, FIG. 4 includes axis 400 extending radially from rotation axis 320, center 382, and center 384, as well as axis 402 extending parallel to a length 406 of a first ridge 404 of the plurality of ridges 394. The axis 400 and axis 402 intersect each other at a location 407 at which the first ridge 404 is joined to the main opening 354 and are angled relative to each other by angle 408. In at least one example, the angle 408 may be more than 5 degrees. The first ridge 404 extends from the location 407 at the main opening 354 to a second location 405 at a perimeter of the fan shroud 302, with the direction of extension of the first ridge 404 from the location

407 at the main opening 354 to the second location 405 being angled relative to a radial direction from the rotation axis 320 to the location 407 (e.g., along axis 400).

Although the first ridge 404 is described above as one example, one or more other ridges of the plurality of ridges 394 may extend away from the main opening 354 in a non-radial direction relative to the rotation axis 320, center 382, and center 384. Further, a different number of ridges of the plurality of ridges 394 (e.g., 15 ridges in the example shown by FIG. 4) may extend from the main opening 354 to first end 385 of the fan shroud 302 relative to a number of ridges (e.g., 16 ridges in the example shown by FIG. 4) extending from the main opening 354 to opposing, second end 387, in some examples.

Arranging the plurality of ridges 394 asymmetrically as described above may reduce an NVH of the fan 301 resulting from the mounting of the fan shroud 302 in the angled position, as well as NVH resulting from the mounting of the heat exchanger 304 to the fan shroud 302 and the coupling of the condenser 307 to the heat exchanger 304. For example, the asymmetric arrangement of the arms may reduce noise resulting from harmonic frequencies during operation of the fan 301. The combination of the asymmetrical arrangement of the arms, the different thicknesses of the arms, and the asymmetrical arrangement of the ridges increase the structural support of the fan shroud 302 to enable the fan shroud 302 to support components of the vehicle, such as heat exchanger 304 and condenser 307, and maintain the position of the components within the vehicle. Further, the combination of the configuration of the arms and ridges may alter NVH characteristics associated with rotation of the fan impeller 318 to reduce NVH resulting from the mounting of the heat exchanger 304 to the fan shroud 302 and the coupling of the condenser 307 to the heat exchanger 304 as described above, increasing user comfort (e.g., reducing a noise of the fan 301 during operation of the fan 301).

In one embodiment, a fan shroud comprises: an opening adapted to house a fan impeller; an upper extension including a first surface adapted to engage with an upper frame bracket of a vehicle; and a foot including a second surface adapted to engage with a lower frame bracket of the vehicle, where a normal of the second surface is parallel to a normal of the first surface and non-orthogonal to a normal of the opening. In a first example of the fan shroud, the fan shroud further comprises a plurality of mating features shaped to couple with counterpart mating features of a heat exchanger, the mating features, upper extension, and foot arranged to support a weight of the heat exchanger. A second example of the fan shroud optionally includes the first example, and further includes a third surface forming the opening, the foot joined directly to the third surface. A third example of the fan shroud optionally includes one or both of the first and second examples, and further includes an opposing, fourth surface arranged parallel to the third surface, the fourth surface adapted to engage directly with the heat exchanger. A fourth example of the fan shroud optionally includes one or more or each of the first through third examples, and further includes a plurality of arms arranged asymmetrically around an annular support centered at a rotation axis of the fan impeller, the rotation axis arranged coaxially with the normal of the opening, with each arm of the plurality of arms extending from the annular support to a perimeter of the opening. A fifth example of the fan shroud optionally includes one or more or each of the first through fourth examples, and further includes wherein the upper extension is offset from the foot by approximately a same length in both a direction of the normal of the first surface and a direction orthogonal to the normal of the first surface. A sixth example of the fan shroud optionally includes one or more or each of the first through fifth examples, and further includes wherein the upper extension includes a first aperture formed by the first surface and extending through the upper extension parallel to the normal of the first surface, the first aperture adapted to receive a fastener to couple the fan shroud to the upper frame bracket between a frunk of the vehicle and a ground surface on which the vehicle sits in a vertical direction of the vehicle. A seventh example of the fan shroud optionally includes one or more or each of the first through sixth examples, and further includes wherein the upper extension is offset from the foot by a length extending in a first direction orthogonal to the normal of the second surface and away from the opening. An eighth example of the fan shroud optionally includes one or more or each of the first through seventh examples, and further includes wherein the length by which the upper extension is offset from the foot in the first direction is greater than a radius of the opening. A ninth example of the fan shroud optionally includes one or more or each of the first through eighth examples, and further includes wherein an angle between the normal of the first surface or the normal of the second surface and the normal of the opening is approximately 45 degrees.

In one embodiment, a system comprises: a fan shroud including: a first surface and an opposing, second surface joined together at a first end and an opposing, second end, with a main opening extending from the first surface to the second surface; an axial flow impeller disposed within the main opening, with a rotation axis of the axial flow impeller arranged normal to the opening and orthogonal to a direction from the first end to the second end; a plurality of fan shroud mating features extending from the first and second end; and a plurality of feet joined to the first surface and a heat exchanger adapted to mount to the fan shroud, including: a first plurality of heat exchanger mating features shaped to engage with the plurality of fan shroud mating features, and a plurality of coolant tubes adapted to engage in direct contact with the second surface and extend across the opening. In a first example of the system, the system further comprises a condenser adapted to mount to the heat exchanger via a plurality of condenser mating features shaped to engage with a second plurality of heat exchanger mating features of the heat exchanger. A second example of the system optionally includes the first example, and further includes wherein the second surface is arranged at an inlet end of the fan shroud relative to an airflow direction of the axial flow impeller and the first surface is arranged at an opposing, outlet end of the fan shroud, where the plurality of coolant tubes engage with the second surface upstream of the axial flow impeller in the airflow direction, and where the condenser mounts to the heat exchanger upstream of the coolant tubes in the airflow direction. A third example of the system optionally includes one or both of the first and second examples, and further includes wherein the plurality of feet extend outward and terminate at an angle between 40 and 50 degrees relative to the rotation axis of the axial flow impeller. A fourth example of the system optionally includes one or more or each of the first through third examples, and further includes wherein the plurality of fan shroud mating features includes a plurality of protrusions, the first plurality of heat exchanger mating features includes a plurality of clips, and each clip of the plurality of clips is shaped to lock to a corresponding protrusion of the plurality of protrusions.

In another embodiment, a system comprises: a fan shroud including: a main opening extending between an inlet end and an outlet end, the main opening housing a fan impeller, with a rotation axis of the fan impeller centered at the main opening; a plurality of upper extensions and a plurality of feet adapted to mount the fan shroud to a frame of a vehicle with the rotation axis arranged at an angle relative to a ground surface on which the vehicle sits; and a plurality of reinforcement features formed at the outlet end and arranged asymmetrically around the main opening; and a heat exchanger including a plurality of mating features adapted to engage with counterpart mating features of the fan shroud, with the heat exchanger separated from the frame by the fan shroud. In a first example of the system, the system further comprises a condenser adapted to mount to the heat exchanger, with the condenser separated from the frame by the fan shroud. A second example of the system optionally includes the first example, and further includes wherein the reinforcement features include a plurality of arms extending across the main opening to an annular support centered at the rotation axis, where each arm of the plurality of arms is joined to the outlet end by a respective arm support of a plurality of arm supports extending parallel to the rotation axis, with a first arm of the plurality of arms having a different thickness than at least one other arm of the plurality of arms. A third example of the system optionally includes one or both of the first and second examples, and further includes wherein the first arm or a second arm of the plurality of arms extends from the annular support to a first arm support of the plurality of arm supports in a direction that is angled relative to a radial direction from the rotation axis to the first arm support. A fourth example of the system optionally includes one or more or each of the first through third examples, and further includes wherein the reinforcement features include a plurality of ridges extending from the main opening to a perimeter of the fan shroud at the outlet end, where, for each ridge of the plurality of ridges, the ridge extends from a first respective location at the main opening to a second respective location at the perimeter in a direction that is angled relative to a radial direction from the rotation axis to the second respective location.

FIGS. 2-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fan shroud, comprising:
an opening adapted to house a fan impeller;
an upper extension including a first surface adapted to engage with an upper frame bracket of a vehicle; and a foot including a second surface adapted to engage with a lower frame bracket of the vehicle, where a normal of the second surface is parallel to a normal of the first surface and non-orthogonal to a normal of the opening, wherein the upper extension is offset from the foot by approximately a same length in both a direction of the normal of the first surface and a direction orthogonal to the normal of the first surface.

2. The fan shroud of claim 1, further comprising a plurality of mating features shaped to couple with counterpart mating features of a heat exchanger, the mating features, upper extension, and foot arranged to support a weight of the heat exchanger.

3. The fan shroud of claim 1, further comprising a third surface forming the opening, the foot joined directly to the third surface.

4. The fan shroud of claim 3, further comprising an opposing, fourth surface arranged parallel to the third surface, the fourth surface adapted to engage directly with the heat exchanger.

5. The fan shroud of claim 1, further comprising a plurality of arms arranged asymmetrically around an annular support centered at a rotation axis of the fan impeller, the rotation axis arranged coaxially with the normal of the opening, with each arm of the plurality of arms extending from the annular support to a perimeter of the opening.

6. The fan shroud of claim 1, wherein the upper extension includes a first aperture formed by the first surface and extending through the upper extension parallel to the normal of the first surface, the first aperture adapted to receive a fastener to couple the fan shroud to the upper frame bracket between a frunk of the vehicle and a ground surface on which the vehicle sits in a vertical direction of the vehicle.

7. The fan shroud of claim 1, wherein the upper extension is offset from the foot by a length extending in a first direction orthogonal to the normal of the second surface and away from the opening.

8. The fan shroud of claim 7, wherein the length by which the upper extension is offset from the foot in the first direction is greater than a radius of the opening.

9. The fan shroud of claim 1, wherein an angle between the normal of the first surface or the normal of the second surface and the normal of the opening is approximately 45 degrees.

10. A system, comprising:
a fan shroud including:
a first surface and an opposing, second surface joined together at a first end and an opposing, second end, with a main opening extending from the first surface to the second surface;
an axial flow impeller disposed within the main opening, with a rotation axis of the axial flow impeller arranged normal to the opening and orthogonal to a direction from the first end to the second end;
a plurality of fan shroud mating features extending from the first and second end;
a plurality of upper extensions that each include an upper frame bracket surface adapted to engage with an upper frame bracket of a vehicle; and
a plurality of feet joined to the first surface, wherein the plurality of upper extensions are offset from the plurality of feet by approximately a same length in both a direction of the normal of upper frame bracket surfaces and a direction orthogonal to the normal of the upper frame bracket surfaces; and
a heat exchanger adapted to mount to the fan shroud, including:
a first plurality of heat exchanger mating features shaped to engage with the plurality of fan shroud mating features, and
a plurality of coolant tubes adapted to engage in direct contact with the second surface and extend across the opening.

11. The system of claim 10, further comprising a condenser adapted to mount to the heat exchanger via a plurality of condenser mating features shaped to engage with a second plurality of heat exchanger mating features of the heat exchanger.

12. The system of claim 11, wherein the second surface is arranged at an inlet end of the fan shroud relative to an airflow direction of the axial flow impeller and the first surface is arranged at an opposing, outlet end of the fan shroud, where the plurality of coolant tubes engage with the second surface upstream of the axial flow impeller in the airflow direction, and where the condenser mounts to the heat exchanger upstream of the coolant tubes in the airflow direction.

13. The system of claim 10, wherein the plurality of feet extend outward and terminate at an angle between 40 and 50 degrees relative to the rotation axis of the axial flow impeller.

14. The system of claim 10, wherein the plurality of fan shroud mating features includes a plurality of protrusions, the first plurality of heat exchanger mating features includes a plurality of clips, and each clip of the plurality of clips is shaped to lock to a corresponding protrusion of the plurality of protrusions.

15. A system, comprising:
a fan shroud including:
a main opening extending between an inlet end and an outlet end, the main opening housing a fan impeller, with a rotation axis of the fan impeller centered at the main opening;
a plurality of upper extensions and a plurality of feet adapted to mount the fan shroud to a frame of a vehicle with the rotation axis arranged at an angle relative to a ground surface on which the vehicle sits, the plurality of upper extensions each including an upper bracket surface adapted to engage with an upper frame bracket of the vehicle, wherein the plurality of upper extensions are offset from the plurality of feet by approximately a same length in both a direction of normal of the upper bracket surfaces and a direction orthogonal to the normal of the upper bracket surfaces; and
a plurality of reinforcement features formed at the outlet end and arranged asymmetrically around the main opening; and
a heat exchanger including a plurality of mating features adapted to engage with counterpart mating features of the fan shroud, with the heat exchanger separated from the frame by the fan shroud.

16. The system of claim 15, further comprising a condenser adapted to mount to the heat exchanger, with the condenser separated from the frame by the fan shroud.

17. The system of claim 15, wherein the reinforcement features include a plurality of arms extending across the main opening to an annular support centered at the rotation axis, where each arm of the plurality of arms is joined to the outlet end by a respective arm support of a plurality of arm supports extending parallel to the rotation axis, with a first arm of the plurality of arms having a different thickness than at least one other arm of the plurality of arms.

18. The system of claim 17, wherein the first arm or a second arm of the plurality of arms extends from the annular support to a first arm support of the plurality of arm supports in a direction that is angled relative to a radial direction from the rotation axis to the first arm support.

19. The system of claim 15, wherein the reinforcement features include a plurality of ridges extending from the main opening to a perimeter of the fan shroud at the outlet end, where, for each ridge of the plurality of ridges, the ridge extends from a first respective location at the main opening to a second respective location at the perimeter in a direction that is angled relative to a radial direction from the rotation axis to the second respective location.

20. A fan shroud, comprising:
   an opening adapted to house a fan impeller;
   an upper extension including a first surface adapted to engage with an upper frame bracket of a vehicle; and
   a foot including a second surface adapted to engage with a lower frame bracket of the vehicle, where a normal of the second surface is parallel to a normal of the first surface and non-orthogonal to a normal of the opening,
   wherein the upper extension is offset from the foot by a length extending in a first direction orthogonal to the normal of the second surface and away from the opening.

* * * * *